United States Patent [19]

Skipper

[11] 4,265,185
[45] May 5, 1981

[54] PLUG MIX SEED PLANTER

[76] Inventor: Kevin G. Skipper, Merlin, Ontario, Canada

[21] Appl. No.: 967,590

[22] Filed: Dec. 8, 1978

[51] Int. Cl.³ .............................................. A01C 1/00
[52] U.S. Cl. ........................................ 111/1; 111/6; 111/34; 111/51; 111/73; 222/370
[58] Field of Search ................... 111/1, 6, 7, 7.1, 7.4, 111/51, 73, 80, 85, 87, 34; 172/349, 358, 357, 624, 538; 222/333, 504, 362, 270, 370; 221/265; 251/212, 228, 300

[56] References Cited

U.S. PATENT DOCUMENTS

| | | | |
|---|---|---|---|
| 62,006 | 2/1867 | Clark | 111/7 |
| 689,444 | 12/1901 | Williams | 251/300 |
| 1,901,299 | 3/1933 | Johnson | 172/538 X |
| 1,965,741 | 7/1934 | Jameson | 222/370 X |
| 2,340,163 | 1/1944 | White | 111/80 X |
| 2,442,794 | 6/1948 | Wilcox | 111/34 X |
| 2,525,435 | 10/1950 | White | 111/51 X |
| 2,586,980 | 2/1952 | Myers | 222/370 X |
| 2,611,465 | 9/1952 | Simon | 222/504 X |
| 2,901,150 | 8/1959 | Matter | 222/370 |
| 3,087,444 | 4/1963 | Ferguson et al. | 111/85 X |
| 3,390,649 | 7/1968 | Tschudy | 111/1 X |
| 3,417,961 | 12/1968 | Shorrock | 251/212 |
| 3,492,954 | 2/1970 | Rothfelder | 111/51 |
| 3,648,631 | 3/1972 | Fiedler et al. | 111/1 X |
| 4,126,190 | 11/1978 | Wylie | 172/624 |

FOREIGN PATENT DOCUMENTS

| | | | |
|---|---|---|---|
| 73011 | 1/1917 | Austria | 111/7.4 |
| 818200 | 8/1959 | United Kingdom | 111/85 |

*Primary Examiner*—James R. Feyrer
*Attorney, Agent, or Firm*—Allen D. Gutchess, Jr.

[57] ABSTRACT

This invention consists of a tractor drawn planter which automatically deposits equally spaced sprout bearing plugs of specially prepared nutrient soil, into the ground. It is made of a rectangular framework having two rear wheels upon which it rides and a flexible hitch for attachment to the tractor. A tank equipped with an agitator, a plug size measuring device, and a discharge tube, contains the plug mixture. The discharge tube is provided inside with doors which allow the passage of the plugs at predetermined equal intervals. These doors are controlled by a spring-loaded solenoid which is, in turn, controlled by electrical make-and-break contact points powered by the tractor battery. A floating shoe digs a furrow into which the plugs are dropped, and two spring-loaded converging wheels in the rear of the frame cover and tamp down the seeded furrow. Rotation is provided to the agitator, the plug measuring device, and the electrical contact points by a train of chain-connected sprockets from a takeoff from the rear wheels of the planter. The planter can also be equipped with a supply tank and pipe for adding a measured quantity of gel containing water and seeds with the plug. A solenoid-operated cylinder supplies the gel from the tank to the pipe in synchronization with the discharge of the plugs.

2 Claims, 14 Drawing Figures

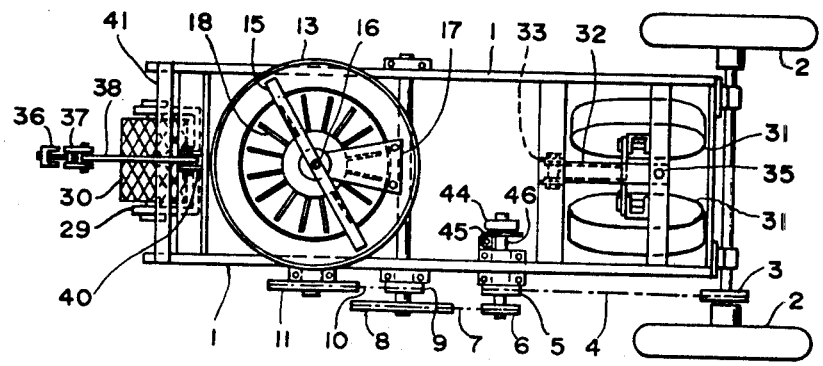
FIG. 2
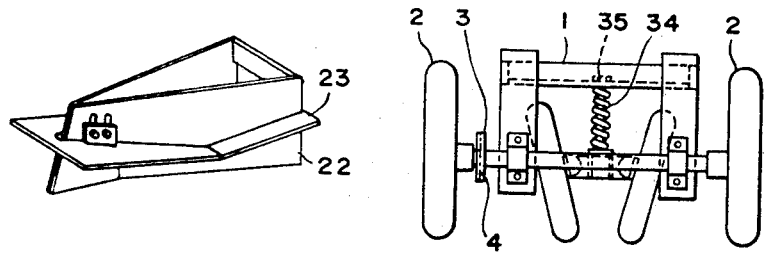
FIG. 4
FIG. 3
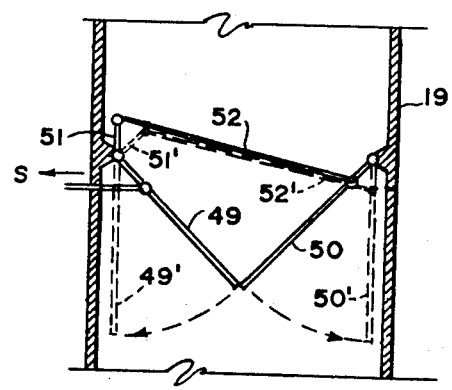
FIG. 5

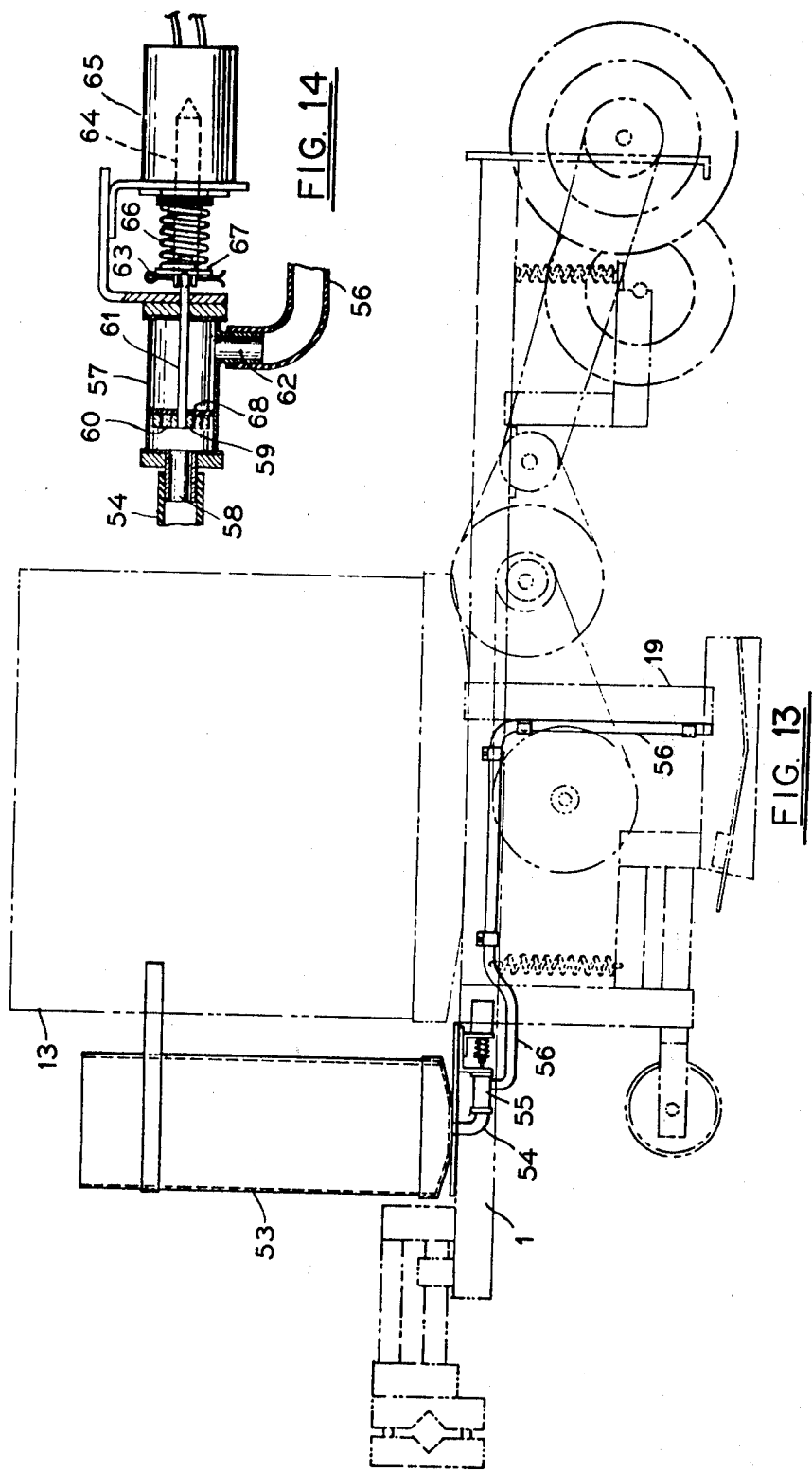

PLUG MIX SEED PLANTER

This invention consists of an automatic plug mix planter for the planting of tomatoes and other vegetables such as cucumbers, melons, tobacco, etc.

In the process of planting tomatoes, which is the vegetable here used to illustrate the action of the invention, the tomato seeds are mixed into a rich specially prepared soil mixture in which they are allowed to sprout to a certain point, after which they are transplanted in the field. In transplanting these seeds into the field, especially spaced plugs of the solid mixture containing these sprouts are inserted into the ground in equally spaced rows so as to provide growing and picking space. A gel containing seeds and water can also be planted with the plug.

With few exceptions, prior to this invention the planting of tomatoes has been done manually. Where a machine has been used in the planting of tomatoes, it usually consisted of the use of a pot planter, a system which proved to be complicated, unreliable and expensive, mainly because pot planters are too heavy, too complicated, and not actually designed for planting plug mix items, into the ground.

It is, therefore, the primary object of this invention to provide an automatic plug mix planting machine, which is specifically designed to perform efficiently for that purpose; which is of simple construction; and which will, at the same time, provide a reliable and a considerable cost saving performance.

Another object of this invention is to provide additional moisture to the plug, by way of the gel, to secure and improve extensively the growth of the seeds and sprouts contained in the said plug.

This is accomplished in the invention by providing a machine in which the automation is electrically operated, thereby reducing the weight of the mechanism by the elimination of complicated mechanical components, and increasing its reliability by reducing the number of possible sources of damage replacement, break-down time, and costly repairs. The saving in operation costs results from the elimination of at least one hired worker per row, by the use of this invention.

In describing the invention, reference will be made to the attached drawings, in which:

FIG. 2 is a plan view of the planter,

FIG. 3 is a rear view of the planter,

FIG. 4 is a perspective view of a plow of the planter,

Figure 6:
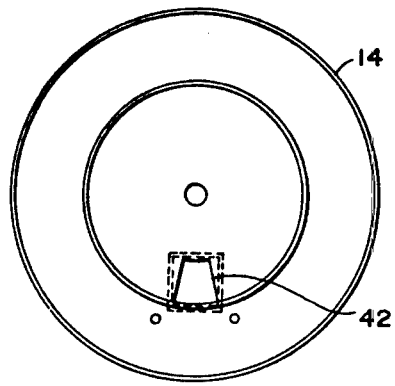
Figure 10:
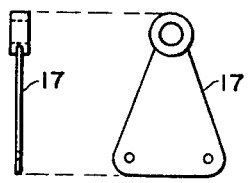
Figure 7:
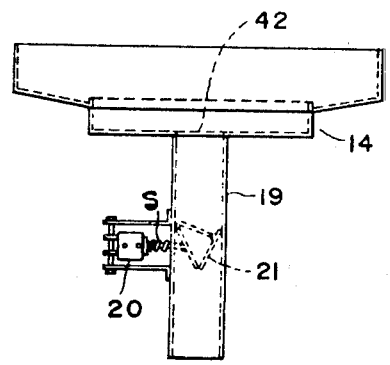
Figure 11:
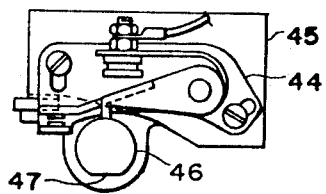
Figure 12:
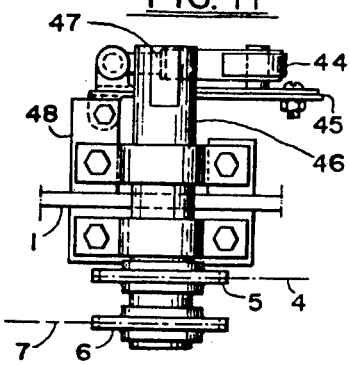
Figure 8:
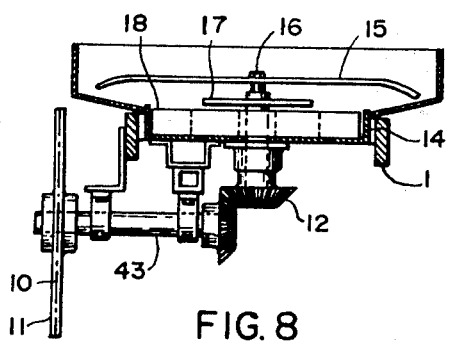

FIG. 5 is a sectional view of the chute leading from the plug mixture container to the ground, FIG. 6 is a plan view of the sprouting plug mixture container, FIGS. 7, 8, 9, 10, 11 and 12 are various views of the components of the automatic plug mixture intermittent discharge device, FIG. 13 is an elevation of the gel-supplying apparatus showing its installation on the planter, and FIG. 14 shows a detail, partly in section of the intermittent feeding control of the gel.

In the drawings, the planter is shown consisting of a rectangular frame 1 which is supported at the rear end thereof by two rubber tired wheels 2, 2, and is provided at its front end with means for attachment to a tractor (not shown in the drawings).

A comparatively large cylindrical container 13 in which is stored the plug mixture is located on the top of the frame and near the front end thereof. A rectangular, vertical chute 19 discharges the plugs from the container 13 to the ground.

Just below the chute 19 and traveling upon the ground is a triangular plow in the form of a floating shoe 22, the forward point of which digs a furrow. The depth of the furrow is more or less controlled by skid plates 23, which are turned upwardly to float upon the ground, and located one on each side of the said shoe. The floating shoe 22 is connected to the frame 1 by a frame member 25 and by a pair of pivoting, spaced horizontal and parallel arms 26 and 28. These are pivotally held in their front ends by the frame member 25, and in the rear, by a short vertical support 27 which also attaches the arms to the floating shoe 22. The front end of the lower arm 28 extends into a clevis 29 which contains a knurled roller 30 which levels and firms the soil and makes it ready for the shoe 22. A spring 24, between the frame 1 and the upper arm 26, helps to stabilize the shoe 22.

Rotating components within and at the bottom of the container 13 are provided to maintain a faultless discharge of plugs at predetermined regular intervals. These components consist of a rotating agitator bar 15 which is attached to a central shaft 16, whose purpose is to prevent packing and binding of the plug mix. Attached to the center and below the base of the container 13, is a shallow circular pan 14 of a smaller diameter than that of the container 13. Within the pan 14, rotates a circular wheel 18 (see FIG. 9), provided with equally spaced walls 18A at its perimeter which divide the space within the pan 14 into a plurality of equal and rotating compartments 18B, each compartment being large enough to contain and pass through it freely a single measured amount of plug mix.

The pan 14 is provided at its rim with an opening 42 which corresponds in shape and size with the cross section of a compartment 18B, so that a plug mix in the compartment, when it coincides with the opening 42, falls through the opening into chute 19, and is released to fall to the ground by a solenoid-operated, double-hinged, trippping door 21 located within the chute 19. A plate cover 17 is located between the agitator 15 and the pan 14, and directly above the discharge hole 42, to prevent any plug mix, other than the measured plug, from entering the chute.

In the rear of the framework 1 is a pair of downwardly converging furrow wheels 31, 31. These wheels serve the purpose of covering the inserted plug with the earth dug up by the shoe 22. The wheels 31, 31, are supported from the frame by frame members 32 and 33, and are allowed a small amount of free up and down motion by a spring 34 which is held in position by an internal guide rod 35.

The various rotating members of the planter are activated by the rotation of the wheels 2, 2, upon which the planter rides, by means of a train of sprockets and interconnected chains. Thus, a sprocket 3 which is fixed to the shaft of the wheels 2, drives a sprocket 5, by means of a chain 4. The sprocket 5 is attached to a shaft 46 (FIG. 11) which operates electrical contact points 44 which in turn operate a spring-loaded solenoid "S" that intermittently opens and closes the plug release mechanism 21 in the discharge chute 19 (see FIG. 7). The electrical points are attached to the frame by a bracket 45 and a frame part 48; the shaft 46 has a flat part in its wall which allows contact, or breaks contact of the points, depending upon the position of the flat part 47, during the shaft's rotation (see FIGS. 11 and 12). An outer sprocket 6 is also fixed to the shaft 46.

An intermediate shaft, rotatably attached to the framework 1, has an outer sprocket 8 and a smaller inner sprocket 9 fixed to it. A chain 7 joins sprockets 6 and 8.

The mechanism which supplies rotation to the central shaft 16, which rotates the agitator 15 and the feed wheel 18, consists of a pair of bevel gears 12, the horizontal gear being attached to the shaft 16, and the vertical gear being fixed to a shaft 43. The outside end of the shaft 43 is attached to a sprocket 11 which is rotated by a chain 10 from the intermediate sprocket 9.

An enlarged, and more detailed drawing of the plug release mechanism 21 is shown in FIG. 5. Mainly, this mechanism consists of two doors 49 and 50, being hinged at their upper edges to opposite walls on the inside of the chute 19. In the closed position, the lower edges of the walls come together to prevent plugs from passing through them. The door 49 has a short upright extension 51, above the hinge, which is linked to the door 50 by a link 52. When the solenoid "S" pulls the door 49 to the position shown by 49', the extension 51 assumes the position shown by 51'. This pushes the link 52 to the 52' position, and the door 50 to the 50' position, leaving the chute 19 open for the discharge of the plugs.

Figure 1:
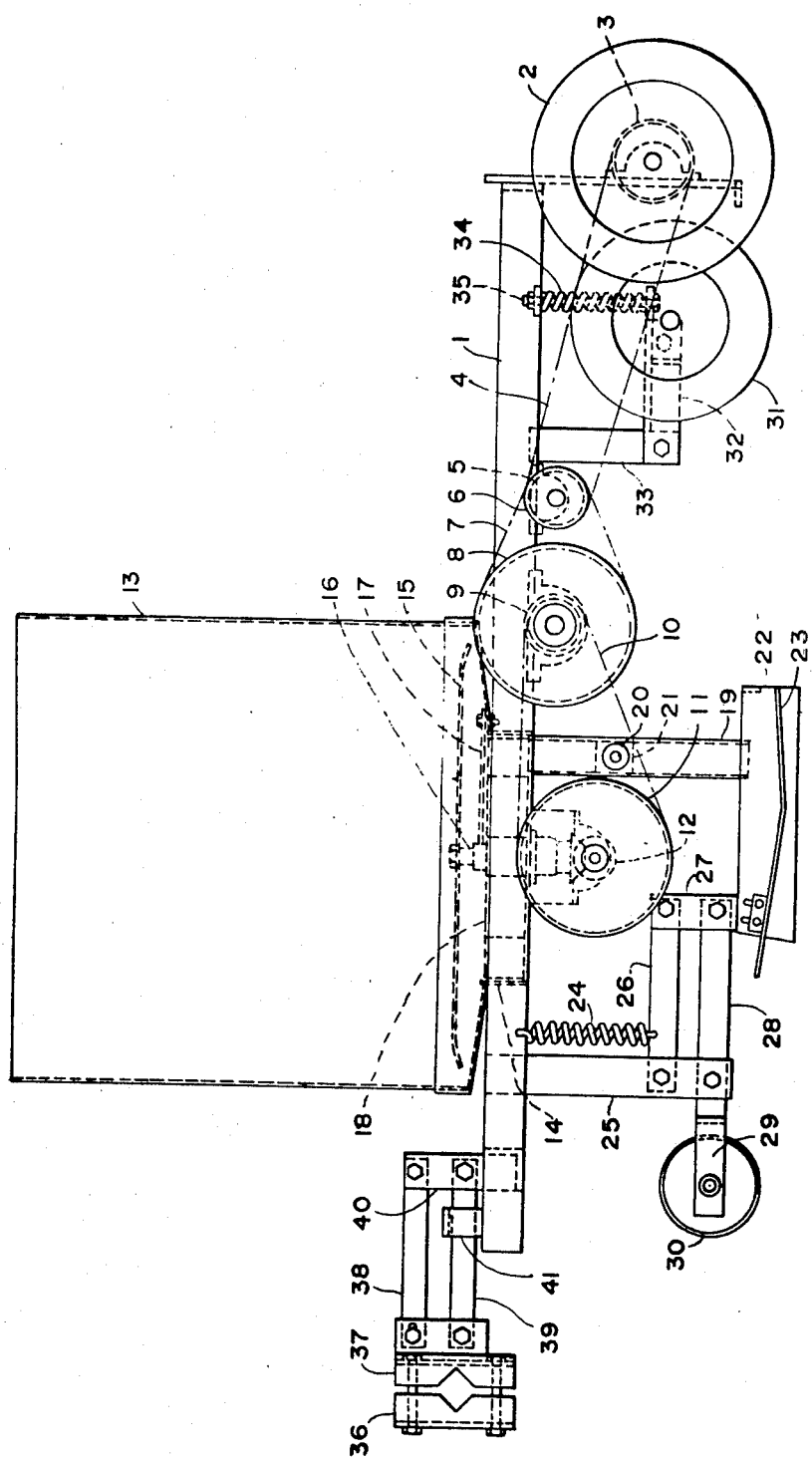
FIG. 1 is a view in elevation of a planter according to the invention.
Figure 9:
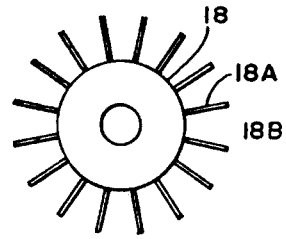

The planter is provided with a hitch which allows a great deal of flexibility to the connection between the planter and its tractor (see FIG. 1). It consists of a clamp made of two separate and oppositely grooved parts 36 and 37 which are bolted together to contain within their grooves the attachment bar of the tractor. The rear part 37 of the clamp is somewhat loosely attached to a pair of parallel, spaced bars 38 and 39, the rear ends of which are similarly attached to frame bracket 40. A "U"-shaped yoke 41 which is attached to the frame 1, rides over the lower bar 39 for the purpose of limiting the degree of flexibility to what is required.

Referring to FIGS. 13 and 14, the invention is shown consisting of a gel storage tank 53 which sits upon the framework 1 of the planter which is the same as the planter of FIG. 1. The tank is further supported by being connected to the plug storage container 13. The tank 53 is provided at its bottom with a discharge pipe 54, which is connected to the intake end of a measuring and intermittent discharge control mechanism 55. A pipe 56 leads from the discharge end of the control mechanism 55 to the planter discharge chute 19, so that the discharge end of the pipe 56 is side-by-side with the discharge end of the chute 19.

The gel discharge control mechanism 55, as shown in FIG. 14, consists of a cylinder 57 having at the front end thereof a central intake 58 a piston 59 which is provided with a plurality of holes 60, a piston 61, and a discharge 62. The rear end of the piston rod 61 is attached with a cotter pin 63 to a solenoid plunger 64 which is partly contained within a solenoid coil 65. The exposed part of the plunger is spring loaded with a spring 66 located between a washer 67 abutting the pin 63 and the front end of the solenoid coil 65. A rubber disc 68 abuts the rear wall of piston 59.

The control mechanism 55 is powered by the tractor electrical system, and the discharge is timed by the make-and-break contact points of the planter, so that the discharge of the gel is synchronized with the discharge of the plugs.

The operation of the discharge control mechanism 55 consists of the solenoid coil 65 becoming activated electrically by the contact points in the planter and drawing the plunger 64 into the coil 65, thus drawing the piston 10 and filling the cylinder with the gel from the storage tank 1. When the contact is broken on the contact point, the piston is returned to its original position by the spring 66. The return of the piston does not disturb the contents of the cylinder because the disc 68 bends backward and allows the gel in front of the piston to pass through the holes 60. On the next backward stroke of the piston, the disk 68 presses tightly against the rear of the piston and closes the holes 60 so that the gel content of the cylinder is forced out of the discharge 62 into the pipe 56. When the pipe 56 is filled, those quantities of gel will be intermittently discharged from the end of pipe.

Various mechanically operated intermittent discharge controls were considered during the design of this invention, however, this solenoid operated mechanism was found to be the least costly to manufacture, requiring very little maintenance, and requiring very little labor and replacement time.

Field trials have shown that this planter can travel over any terrain or type of soil and maintain a consistent planting depth, because of the independent shoe or plow suspension. It has also been found that due to the light weight construction of this planter, it can be pulled by a small tractor, thereby freeing heavy duty tractors to prepare the ground for other types of planting where greater power of operation and soil compression is required.

Further experimentation has shown this planter capable of traveling up to a speed of 7 miles per hour in performing the planting operation, as compared to other planters whose speed is limited to 0.4 miles per hour.

Other proven advantages in the use of this invention can be listed as follows:

(a) As can be seen from the attached drawings, this planter can be built sufficiently narrow in width to allow the planting of the plugs in rows as close as 24 inches apart as compared to 36 inches spaced rows used at the present time.

(b) The plug mix hopper can be made large enough to considerably reduce the costly refill time; and the size of the plug and planting space is easily adjustable.

Although this planter is shown operating on electricity, which is supplied by the electrical source of the tractor which is pulling it, the source of power can be pneumatic. Electricity as the source of power for the operation of this invention is preferred because this choice of power reduces its weight and cost of manufacture, requires less maintenance, and reduces the cost of operation.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. A plug planter for planting, in synchronization, gel and plugs containing sprouts, said planter comprising, in combination, a framework, ground-engaging wheels carried by said framework for supporting same, a container carried by said framework for storing a mixture from which the plugs are formed, said container having a discharge chute extending toward the ground, gate means within said chutes for intermittently discharging the plugs therefrom, a plow located below said discharge chute and movably supported by said framework, mechanically-operated, electrical make-and-break contact points connected to at least one of said wheels for controlling said gate means for controlling discharge of the plugs at predetermined intervals, a device carried by said planter for discharging measured quantities of gel synchronously with the discharge of the plugs, said device comprising a gel-containing tank, and discharge means for discharging gel from said gel-containing tank in uniformly-measured quantities, said discharge means comprises a cylinder, a piston in said cylinder, a piston rod connected to said piston, a solenoid coil having a core connected with said piston rod for moving said piston rod and said piston in one direction in said cylinder when said solenoid coil is activated, a spring for moving said piston rod and said piston in the opposite direction when the solenoid coil is activated, an inlet in one end portion of said cylinder, an outlet in another end portion of said cylinder, whereby a measured quantity of the gel moves from said inlet to said outlet when the piston moves in said cylinder in a direction toward said outlet from said inlet, pipe means having a discharge end located adjacent said discharge chute and having another end communicating with said cylinder outlet, second pipe means connecting a lower portion of said gel-containing tank with said cylinder inlet, said solenoid coil being activated by said make-and-break contact points to cause the uniformly-measured quantities of gel to be discharged substantially simultaneously with the plugs, with the rate of discharge of the plugs and the quantities of gel also being coordinated with the rate of rotation of said ground-engaging wheels.

2. A tractor-drawn planter for planting, in synchronization, gel and plugs containing spouts, said planter comprising, in combination, a framework, ground-engaging wheels carried by said framework for supporting same, a container carried by said framework for storing a mixture from which the plugs are formed, means in said container for producing measured plugs, said container having a discharge chute extending toward the ground, electrically-operated gate means within said chute for intermittently discharging the plugs therefrom, a plow located below said discharge chute and movably supported by said framework, mechanically-operated means coordinated with the speed of said planter for controlling said gate means for controlling discharge of the plugs at predetermined intervals, a device carried by said planter for discharging measured quantities of gel synchronously with the discharge of the plugs, said device comprising a gel-containing tank, and a discharge means for discharging gel from said gel-containing tank in uniformly-measured quantities, said discharge means comprising a cylinder, a piston in said cylinder, one-way valve means carried by said piston to enable gel in said cylinder to flow through said piston when said piston moves in one direction in said cylinder but not in the other direction, a piston rod, a solenoid coil having a core connected with said piston rod for moving said piston rod and said piston in one direction in said cylinder when the coil is activated, means for moving said piston rod and said piston in the opposite direction when the solenoid coil is inactivated, an inlet in one end portion of said cylinder, an outlet in another end portion of said cylinder, whereby a measured quantity of the gel moves from said inlet to said outlet when the piston moves in said cylinder in a direction toward said outlet from said inlet, pipe means having a discharge end located adjacent said discharge chute and having another end communicating with said cylinder outlet, second pipe means connecting a lower porton of said gel-containing tank with said cylinder inlet, said solenoid coil being activated by said mechanically-operated means to cause the uniformly-measured quantities of gel to be discharged substantially simultaneously with the plugs, with the rate of discharge of the plugs and the quantities of gel also being coordinated with the speed of said planter.

* * * * *